Patented Mar. 10, 1936

2,033,679

UNITED STATES PATENT OFFICE 2,033,679

HYDROXYETHYLAPOQUININE AND THE METHOD OF ITS PRODUCTION

Courtland L. Butler and Leonard H. Cretcher, Pittsburgh, Pa., assignors to Mellon Institute of Industrial Research, a corporation of Pennsylvania No Drawing. Application February 27, 1934, Serial No. 713,126

3 Claims. (Cl. 260—26)

This invention consists in a new compound, hydroxyethylapoquinine and its salts, and in the method of their formation. These substances having been found to have therapeutic effect and value, when taken and assimilated by living animals, man included.

The accepted formula is this

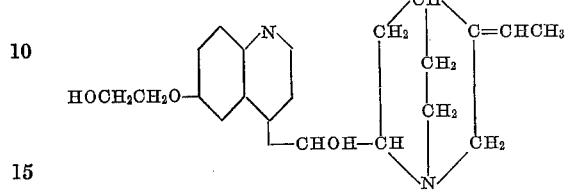

The method of formation is as follows:

Apoquinine is prepared according to the well-known method (Hesse, Ann. CCV, 314, 1880 and Fränkel and Buhlea, Ber. LVIII, 559, 1925) except for two slight modifications. These consist in increasing slightly the proportion of quinine to hydrochloric acid, and reducing the minimum time of heating (at 140–150° C.) from 7 hours to 5. A sodium or potassium salt of apoquinine is prepared and digested with ethylene chlorohydrin or other hydroxyethylating reagent, chlorethyl vinyl ether, glycol monotoluene sulfonate, hydroxydiethyl-sulfate, toluenesulfonylglycol acetate, toluenesulfonylglycol benzoate. The desired hydroxyethylated product is then separated from the reaction mixture.

More conveniently, apoquinine prepared according to the usual method, modified as stated above, is partially purified before submitting it to the action of the hydroxyalkylating agent. To this end 2 parts of apoquinine are dissolved in 9 parts of absolute alcohol. The base is converted to dihydrochloride by passing dry HCl gas into the solution until it is acid to methyl orange. Five parts of anhydrous ether are then added and the mixture is allowed to stand until crystallization is complete. Partially purified apoquinine dihydrochloride is then filtered off, washed twice with 1:1 ether alcohol mixture, and several times with dry ether. 1.4 to 1.6 parts of salt having an optical rotation of about $[\alpha]_D$ —198° in water are obtained.

The so obtained apoquinine dihydrochloride is converted to sodium or potassium salt and the hydroxyethyl group is introduced by alkylation, (conveniently) in alcoholic solution with ethylene chlorohydrine. The reaction is run for one hour at water bath temperature or for 24 hours at room temperature.

The desired product, hydroxyethylapoquinine is worked up by evaporating the alcohol from the solution and taking up the residue in dilute hydrochloric acid. The acid solution is made strongly alkaline under a layer of ether. The desired base is extracted with ether and the ether solution is dried with anhydrous potassium carbonate or sodium sulfate. The base is thrown out of ether solution as dihydrochloride by addition of alcoholic hydrochloric acid, using methyl orange as indicator. The salt can be crystallized from a mixture of alcohol and ether. It melts at about 228° C. with decomposition.

In both the procedures described, the hydroxyethyl group is introduced into the apoquinine by producing first in alcoholic solution a salt of an akali metal and by adding ethylene chlorohydrin. Other metallic salts may be used as the intermediate product and other hydroxyethylating reagents may be used. The intermediate product may, in any preferred manner, be brought into intimate association with the hydroxyalkylating reagent, whether by means of solution, suspension in a liquid carrier, or otherwise.

Inasmuch as apoquinine is a mixture of substances, it is not now possible to give graphic formula for the product of its hydroxyethylation; it is, however, possible to define it as an hydroxyethyl derivative of apoquinine, and so defined, it is a new and useful product. It has high pneumococcocidal value and, this with low toxicity. We have reason to believe that it may be administered without producing in the patient those visual disturbances sometimes produced by the commonly used ethyl dihydrocupreine.

The method described above is applicable, not to apoquinine alone, but to those other cinchona alkaloids as well, that have a phenolic hydroxyl group. Those others are apoepiquinine, apoquinidine, apoepiquinidine, cupreine, hydrocupreine, cupreidine, hypocupreidine, epihydrocupreine, and epihydrocupreidine. The products of hydroxyethylation are homologs of the product derived from apoquinine, and have like utility. The product of the treatment of hydrocupreine will be recognized to be that disclosed in the application of Cretcher and Nelson, filed September 25, 1933, Serial No. 690,946. The method of formation here described is, however, new.

We claim as our invention:

1. As a new compound, hydroxyethylapoquinine, in which the hydroxyethyl group is attached as a phenol ether.

2. As new compounds, hydroxyethylapoquinine in which the hydroxyethyl group is attached as a phenol ether, and its salts.

3. The method herein described of preparing a hydroxethyl derivative of apoquinine which consists in demethylating quinine and rearranging in the presence of a mineral acid, from

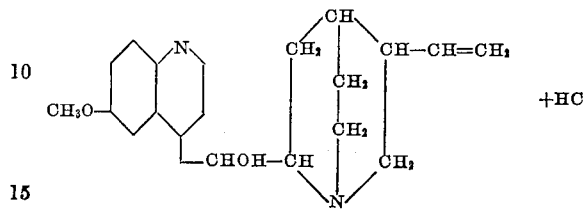 +HC to

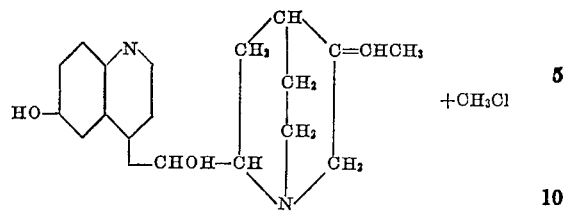 +CH₃Cl and then realkylating with an hydroxyalkylating agent.

COURTLAND L. BUTLER.
LEONARD H. CRETCHER.